United States Patent
Yamada et al.

(10) Patent No.: US 9,359,942 B2
(45) Date of Patent: Jun. 7, 2016

(54) TURBOCHARGER WASTE GATE

(75) Inventors: Shuya S. Yamada, Novi, MI (US);
Keith D. Miazgowicz, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 842 days.

(21) Appl. No.: 13/439,724

(22) Filed: Apr. 4, 2012

(65) Prior Publication Data

US 2013/0263589 A1 Oct. 10, 2013

(51) Int. Cl.
*F02D 23/00* (2006.01)
*F02B 37/18* (2006.01)
*F02D 23/02* (2006.01)
*F02D 13/02* (2006.01)
*F02B 75/12* (2006.01)
*F02D 41/00* (2006.01)
*F02B 37/12* (2006.01)

(52) U.S. Cl.
CPC ............ *F02B 37/183* (2013.01); *F02B 37/18* (2013.01); *F02D 23/02* (2013.01); *F02D 41/0007* (2013.01); *F02B 2037/122* (2013.01); *F02B 2075/125* (2013.01); *F02D 13/0265* (2013.01); *F02D 41/009* (2013.01); *Y02T 10/144* (2013.01)

(58) Field of Classification Search
CPC .............................. F02B 37/183; F02B 37/186
USPC ......................................................... 60/602
See application file for complete search history.

(56) References Cited

U.S. PATENT DOCUMENTS

| | | | | |
|---|---|---|---|---|
| 4,203,296 A | * | 5/1980 | Tanaka | F02B 37/186 60/602 |
| 4,655,040 A | * | 4/1987 | Parker | F02B 37/183 251/25 |
| 4,982,567 A | * | 1/1991 | Hashimoto | F02B 37/001 60/600 |
| 5,551,236 A | | 9/1996 | Zimmer et al. | |
| 6,012,289 A | | 1/2000 | Deckard et al. | |
| 6,574,961 B2 | * | 6/2003 | Shiraishi et al. | 60/602 |
| 6,928,819 B2 | | 8/2005 | Baeuerle et al. | |
| 2009/0094978 A1 | * | 4/2009 | Yamagata et al. | 60/602 |
| 2010/0043429 A1 | * | 2/2010 | Wolk et al. | 60/602 |
| 2010/0186492 A1 | | 7/2010 | Morinaga | |
| 2012/0023933 A1 | * | 2/2012 | Ulrey et al. | 60/605.2 |
| 2012/0023935 A1 | * | 2/2012 | Pursifull et al. | 60/605.2 |
| 2014/0020656 A1 | * | 1/2014 | Kosaka et al. | 123/348 |

FOREIGN PATENT DOCUMENTS

| | | | | |
|---|---|---|---|---|
| GB | 2123483 A | * | 2/1984 | ............ F01D 17/146 |
| JP | 06323158 | | * 11/1994 | |

OTHER PUBLICATIONS

English Translation of JP 06-323158.*

(Continued)

*Primary Examiner* — Thomas Denion
*Assistant Examiner* — Jessica Kebea
(74) *Attorney, Agent, or Firm* — Julia Voutyras; Alleman Hall McCoy Russell & Tuttle LLP (57) ABSTRACT

A method for operating turbocharger waste gate of a turbocharged engine is disclosed. In one example, the method operates the waste gate synchronous with engine operation via a mechanical coupling between the waste gate and a camshaft or a crankshaft. The approach may reduce turbocharger lag and improve turbocharger efficiency.

17 Claims, 4 Drawing Sheets

(56) References Cited

OTHER PUBLICATIONS

Surnilla, Gopichandra, et al., "Ejector Flow Rate Computation for Gas Constituent Sensor Compensation," U.S. Appl. No. 13/789,369, filed Mar. 7, 2013, 43 pages.

Anonymous, "Fuel cell system operation of air compressor in surge for low power," IPCOM No. 000225308, Published Feb. 7, 2013, 3 pages.

* cited by examiner

TURBOCHARGER WASTE GATE

FIELD

The present description relates to operation of a turbocharger waste gate for an internal combustion engine. The waste gate may be operated to improve turbocharger efficiency and reduce lag time.

BACKGROUND AND SUMMARY

A turbocharger may be coupled to an engine to improve engine output. The turbocharger increases engine output via providing compressed air to the engine. More specifically, an amount of fuel provided to the engine is increased as the amount of air provided to the engine increases so as to increase cylinder charge density, thereby increasing engine torque. However, a turbocharger may not be able to respond to changes in engine load as fast as is desired because of turbine inertia and pumping delays through the engine. One way to improve turbocharger response is to reduce a size of a turbine exhaust inlet. By reducing the turbine inlet size, the velocity of exhaust gas entering the turbine increases and improves turbocharger response. On the other hand, the efficiency of the turbine may be reduced at part load conditions where a waste gate of the turbocharger is at least partially open when the size of the turbine inlet is reduced. The partially open waste gate can lower exhaust pressure upstream of the turbine causing the turbine wheel to perform work on exhaust gas flowing through the turbocharger rather than the exhaust gas performing work on the turbine wheel.

The inventors herein have recognized the above-mentioned disadvantages for operating an engine having a turbocharger with a smaller turbine inlet and have developed a method for overcoming the disadvantages. The method comprises opening and closing a waste gate of a turbocharger synchronously with rotation of an engine.

By operating a waste gate synchronous with engine rotation, it may be possible to open the turbocharger waste gate so that excess exhaust flow can bypass the turbine while a portion of exhaust flow drives a turbine to increase engine and compressor output. Further, the waste gate can be closed when exhaust flow is reduced during a cylinder cycle so that more exhaust energy is transferred from the available exhaust flow to the turbocharger turbine during periods of lower exhaust flow. In this way, it may be possible to adjust exhaust flow through the turbine and waste gate in relation to when exhaust flow can be more efficiently utilized to provide a desired turbocharger output and efficiency.

The present description may provide several advantages. In particular, the approach may improve turbocharger efficiency. Further, the approach may enable use of turbochargers having smaller turbine inlets so that engine and turbocharger response may be improved. Additionally, in one example, the approach provides for the waste gate to be driven directly by the engine to simplify waste gate actuation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
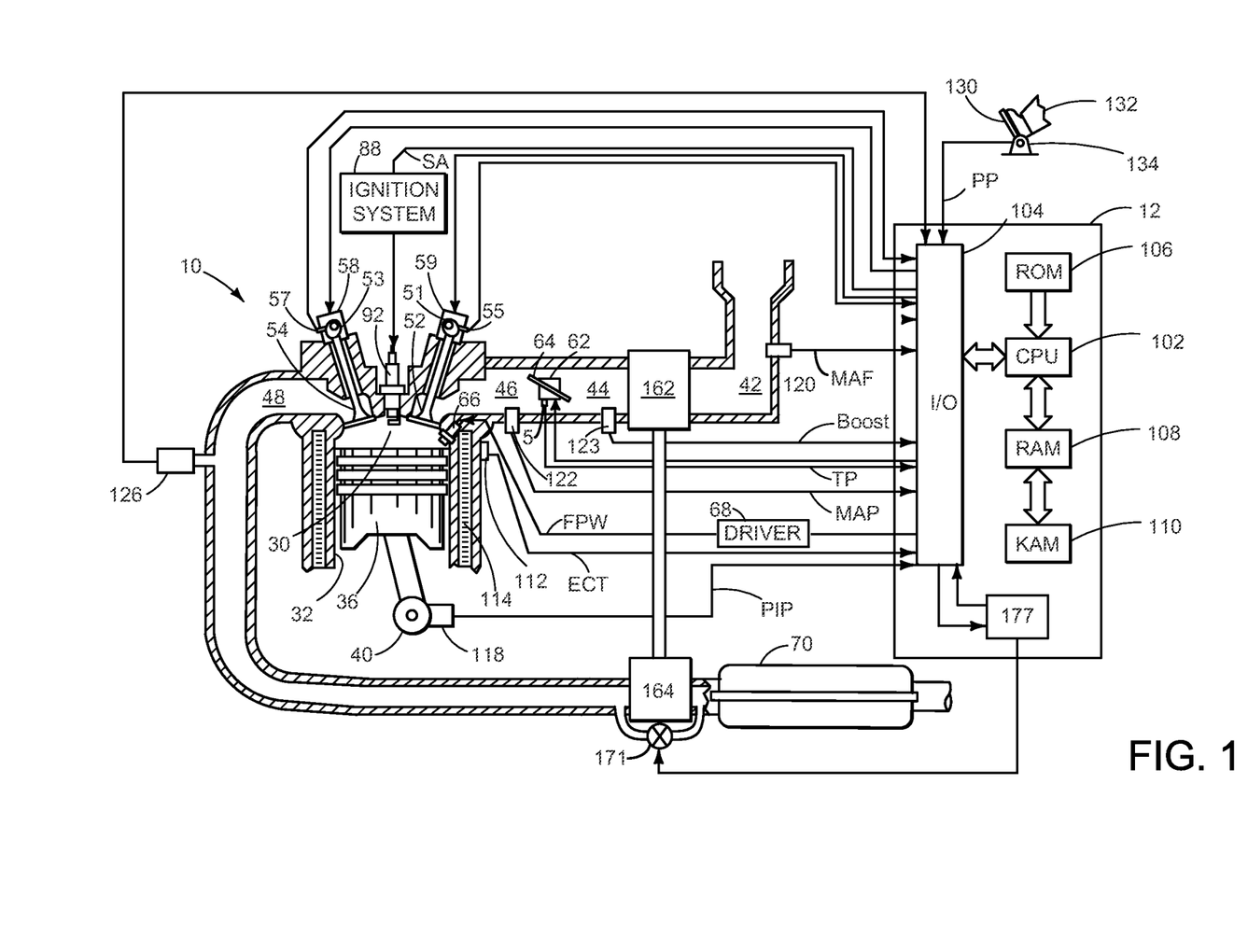
FIG. 1 is a schematic diagram of an engine.
Figure 2A:
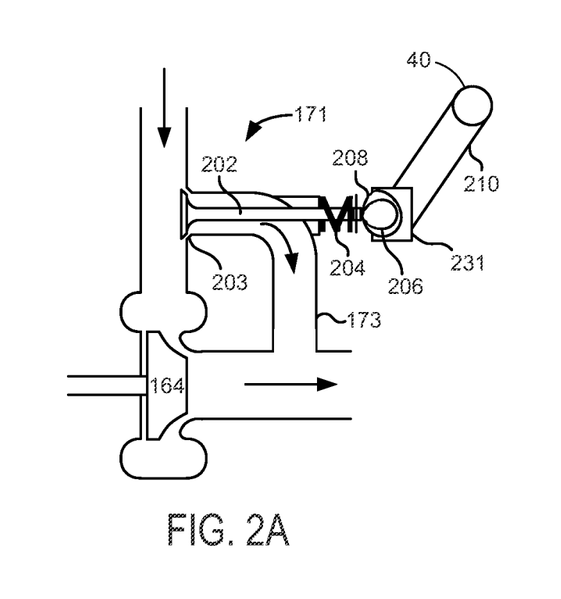
FIGS. 2A and 2B show example waste gate designs.
Figure 2B:
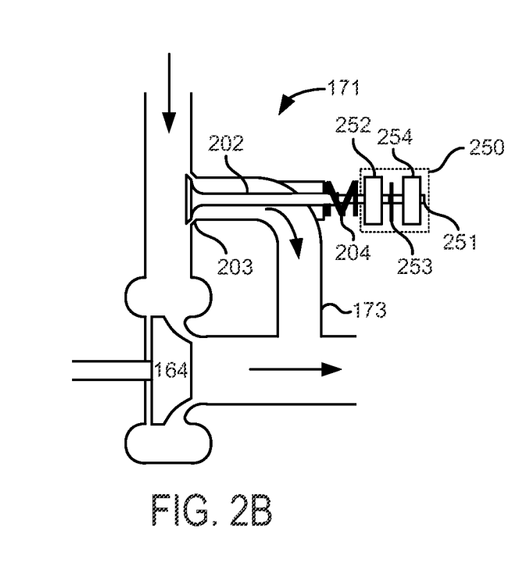
Figure 3:
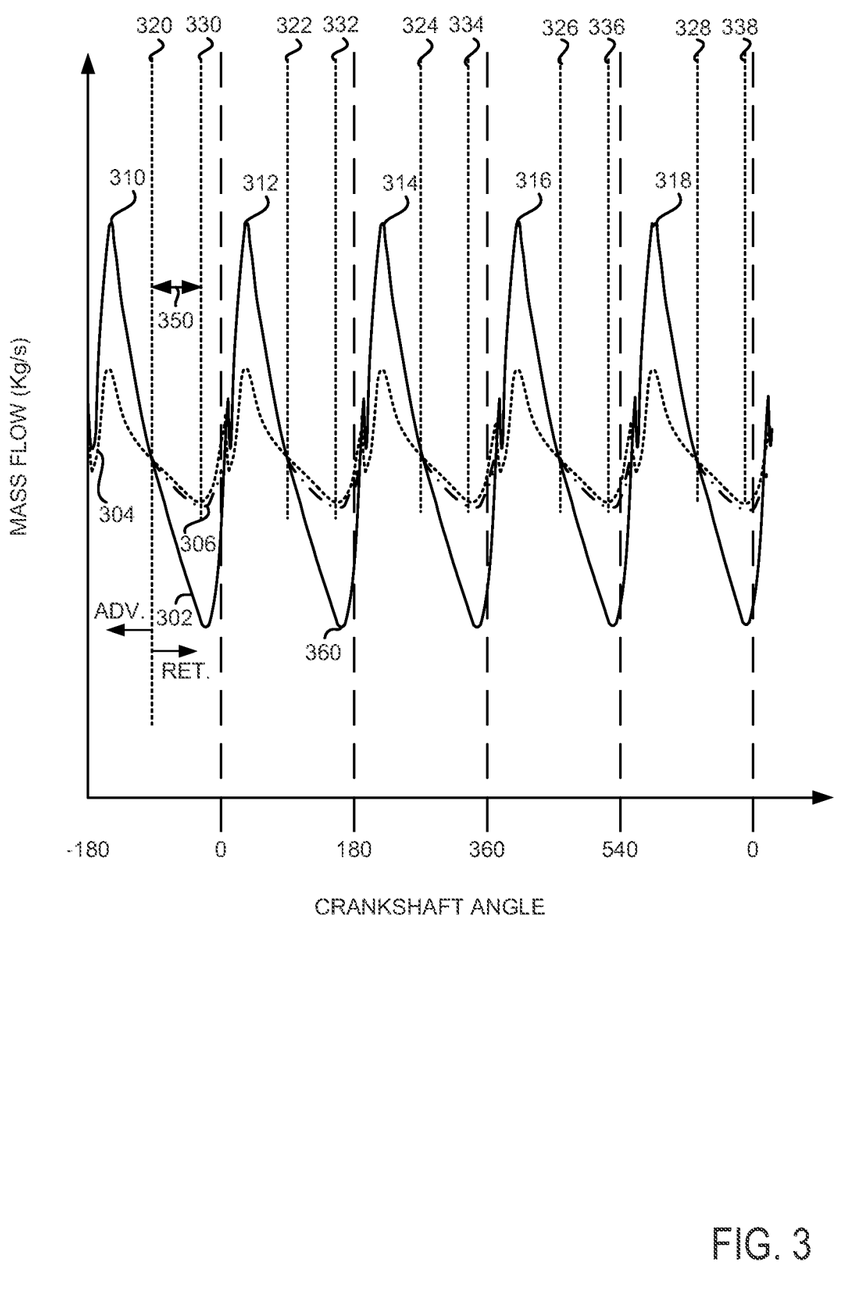
FIG. 3 shows a plot of exhaust flow through a turbine during different operating conditions.

The present description is related to providing a waste gate that improves engine response and turbocharger efficiency. The description also includes a method for operating a turbocharger waste gate. In one example, the turbocharger and waste gate may be part of a system as shown in FIG. 1. The waste gate may be mechanically operated such as shown in the example of FIG. 2A. In other examples, the waste gate may be pneumatically, hydraulically, or electrically operated. FIG. 2B shows one example electromechanically operated waste gate. FIG. 3 is an example simulated plot that illustrates the benefits of operating the waste gate according to the method of FIG. 4.

In one example, the waste gate may operate synchronously with the engine. For example, the waste gate may open or close at specific times or crankshaft angles that coincide with specific engine events. In one example, the waste gate opens each time an exhaust valve of a cylinder opens delivering exhaust to the engine exhaust system upstream of the turbine and waste gate. Thus, the waste gate operates in synchronism with engine events.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 46 and exhaust manifold 48 via respective intake valve 52 and exhaust valve 54. Each intake and exhaust valve may be operated by an intake cam 51 and an exhaust cam 53. The opening and closing time of exhaust valve 54 may be adjusted relative to crankshaft position via cam phaser 58. The opening and closing time of intake valve 52 may be adjusted relative to crankshaft position via cam phaser 59. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In one example, a high pressure, dual stage, fuel system is used to generate higher fuel pressures. In addition, intake manifold 46 is shown communicating with optional electronic throttle 62 which adjusts a position of throttle plate 64 to control air flow from intake boost chamber 44. Compressor 162 draws air from air intake 42 to supply intake boost chamber 44. Exhaust gases spin turbine 164 which is coupled to compressor 162 which compresses air in boost chamber 44. Turbocharger waste gate 171 is a valve that allows exhaust gases to bypass turbine 164 via bypass passage 173 when turbocharger waste gate 171 is in an open state. Substantially all exhaust gas passes through turbine 164 when waste gate 171 is in a fully closed position.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbocharger compressor 164 and catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold absolute pressure (MAP) from pressure sensor 122 coupled to intake manifold 46; a measurement of boost pressure from pressure sensor 123; a measurement of air mass entering the engine from sensor 120; and a measurement of throttle position from a sensor 5. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 46, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2A shows an example turbocharger waste gate 171 that is mechanically operated. Turbocharger waste gate 171 is comprised of a poppet valve 202, return spring 204, and bypass passage 173. Turbocharger waste gate 171 may be actuated by first cam lobe 206 or second cam lobe 208. Second cam lobe 208 provides additional lift to poppet valve 202 when second cam lobe 208 opens poppet valve 202 as compared to when first cam lobe 206 opens poppet valve 202. In one example, a lost-motion device is hydraulically pinned into place to operate second cam lobe 208. Further, lost motion devices may be unpinned to allow first cam lobe 206 and second cam lobe 208 to rotate without opening poppet valve 202. In other examples, lift of poppet valve 202 may be adjusted anywhere between zero lift and a predetermined lift. In one example, first cam lobe 206 and second cam lobe 208 have a number of lobes equal to one half of a number of engine cylinders. First cam lobe 206 and second cam lobe 208 are shown mechanically coupled to crankshaft 40 via belt or chain 210. In other examples, one or more gears may couple crankshaft 40 to first cam lobe 206 and second cam lobe 208. Alternatively, a camshaft may drive first cam lobe 206 and second cam lobe 208. Phase actuator 231 adjusts the timing of first cam lobe 206 and second cam lobe 208 relative to a position of crankshaft 40. Thus, first cam lobe 206 and second cam lobe 208 may be advanced or retarded with respect to a particular location of crankshaft 40.

Turbocharger waste gate 171 operates to selectively allow exhaust to bypass turbine 164 as crankshaft 40 rotates. In particular, first cam lobe 206 and second cam lobe 208 rotate synchronously with crankshaft 40. Poppet valve 202 opens when first cam lobe 206 or second cam lobe 208 reaches a position off of a base circle of first cam lobe 206 or second cam lobe 208. Further, the lobe of first cam lobe 206 and second cam lobe 208 may be manufactured to open and close for a predetermined portion of a blow-down portion of a cylinder cycle. For example, for a four cylinder engine, if an exhaust valve opening duration is 260 crankshaft degrees beginning at 60 crankshaft degrees before bottom dead center expansion stroke and closing 20 crankshaft degrees after top dead center compression stroke, the cam lobe may be manufactured to have 90 crankshaft degrees of waste gate opening beginning at 60 crankshaft degrees before bottom dead center expansion stroke. The cam lobe closing time is also 90 crankshaft degrees in this example since two lobes are provided to open the waste gate twice during each crankshaft revolution. Of course, other mechanical valve actuators are also envisioned.

Referring now to FIG. 2B, an alternative turbocharger waste gate 171 that is electromechanically operated is shown. Turbocharger waste gate 171 is comprised of poppet valve 202, return spring 204, and bypass passage 173. Turbocharger waste gate 171 may be actuated by electromechanical actuator 250. In the present example, electromechanical actuator 250 includes a first coil 254 and a second coil 252. Poppet valve 202 closes when current is passed through first coil 254 to magnetize first coil 254. A magnetic field draws steel plate 253 which is coupled to shaft 251 to first coil 254. Poppet valve 202 fully opens when current is passed through second coil 252 to magnetize second coil 252. A magnetic field draws steel plate 253 to first coil 254. Steel plate 253 is coupled to shaft 251. Poppet valve 202 fully opens when current flows through second coil 252 so that a magnetic field draws steel pate 253 to second coil 252. Poppet valve 202 occupies a neutral state as shown when no current passes through either of first coil 254 and second coil 252.

In one example, controller 12 of FIG. 1 provides current to first coil 254 and second coil 252 depending on engine crankshaft position. For example, controller 12 provides current to second coil 252 when an exhaust valve of a cylinder opens. Controller 12 provides current to first coil 254 approximately half way through a blow-down portion of a cylinder cycle. Further, poppet valve 202 may be opened and closed one time for every two engine cylinders during each crankshaft revolution. Thus, poppet valve is opened synchronously with engine rotation. And, since operation of electromechanical actuator 250 is not driven by the engine, it may be opened whenever desired.

Referring now to FIG. 3, a simulated plot of mass flow through a turbine versus engine crankshaft angle for a four cylinder, four stroke, engine is shown. The Y axis represents mass flow through the turbine and the mass flow rate increases in the direction of the Y axis arrow. The X axis represents engine crankshaft angle and engine crankshaft angle repeats as an engine rotates through an entire cycle (e.g., 720 crankshaft degrees for a four cylinder, four stroke, engine). Top-dead-center compression stroke for cylinder number one is at 0 crankshaft degrees. Top-dead-center compression stroke for cylinder number three is at 180 crankshaft degrees. Top-dead-center compression stroke for cylinder number four is at 360 crankshaft degrees. Top-dead-center compression stroke for cylinder number two is at 540 crankshaft degrees.

Turbine mass flow trace 302 represents mass flow through a turbine with a partially open waste gate for a turbocharger having a smaller turbine inlet. Turbine mass flow trace 304 represents mass flow through a turbine for a turbocharger having a larger turbine inlet. The waste gate for the turbocharger having the larger turbine inlet is held to a level to provide a same amount of boost as the turbocharger with the smaller turbine inlet. Thus, the turbocharger with the smaller turbine inlet is operated at substantially the same operating conditions as the turbocharger having the larger turbine inlet. The mass flow trace 306 represents mass flow through the turbocharger with the smaller turbine inlet when a waste gate of the turbocharger is closed partially through a cylinder blow-down cycle (e.g., time between exhaust valve opening and exhaust valve closing) after being open during a first portion of the cylinder's blow-down cycle. Turbine mass flow trace 306 follows the same trajectory as turbine mass flow trace 302 except as indicated by the dash-dot line 306.

Mass flow peaks for turbine mass flow trace 302 occur at 310-318. The mass flow peaks take place after each time an exhaust valve of one of the four engine cylinders opens and releases exhaust gas to the exhaust manifold. Similar mass flow peaks occur for mass flow trace 304. However, the peak mass flow rates of mass flow trace 304 are lower in magnitude. The mass flow peak at 310 corresponds to the mass flow increase provided when the exhaust valve for cylinder number four opens. The mass flow peak at 312 corresponds to the mass flow increase provided when the exhaust valve for cylinder number two opens. The mass flow peak 314 corresponds to the mass flow increase provided when the exhaust valve for cylinder number one opens. The mass flow peak 316 corresponds to the mass flow increase provided when the exhaust valve for cylinder number three opens. The cycle repeats and the increase in mass flow provided by cylinder number four is indicated at 318.

In this example, the waste gate is closed at the timings indicated by vertical marking lines 320-328. The waste gate is opened at the timings indicated by vertical marking lines 330-338. Thus, during an engine cycle of 720 crankshaft degrees, the waste gate is opened and closed four consecutive times. In this way, the waste gate may be opened only one time for a blow down of a single cylinder during an engine cycle. Further, the waste gate may be closed only one time for a blow down of a single cylinder during an engine cycle. Of course, the waste gate opening and closing sequence may be repeated for multiple engine cycles. The waste gate closing time can be advanced or retarded depending on operating conditions as shown. The waste gate closing duration is shown at 350. The waste gate may be closed for at least 45 crankshaft degrees during an exhaust stroke of a cylinder cycle while an exhaust valve of the cylinder is open. Turbocharger turbine mass flow follows mass flow trace 306 when the waste gate is operated according to the description of marking lines 320-338.

Thus, when a waste gate is synchronously operated with engine rotation, flow through the turbocharger with the smaller inlet follows mass flow trace 302 from top-dead-center compression stroke (e.g., 0 degrees) to vertical marker 322. The waste gate is open during this crankshaft interval. Then, the mass flow follows trace 306 (dot-dash line) to 332. The waste gate is closed during this crankshaft interval. The waste gate is opened again at 332 as the exhaust valve for cylinder number one opens. The waste gate is closed again at 324. In this way, mass flow through the turbine of the turbocharger having the smaller turbine inlet can be increased so as not to decline to the level indicated by trough 360. Accordingly, the average mass flow rate through the turbocharger having the smaller inlet may be increased, thereby improving the efficiency of the turbine with the smaller inlet.

Figure 4:
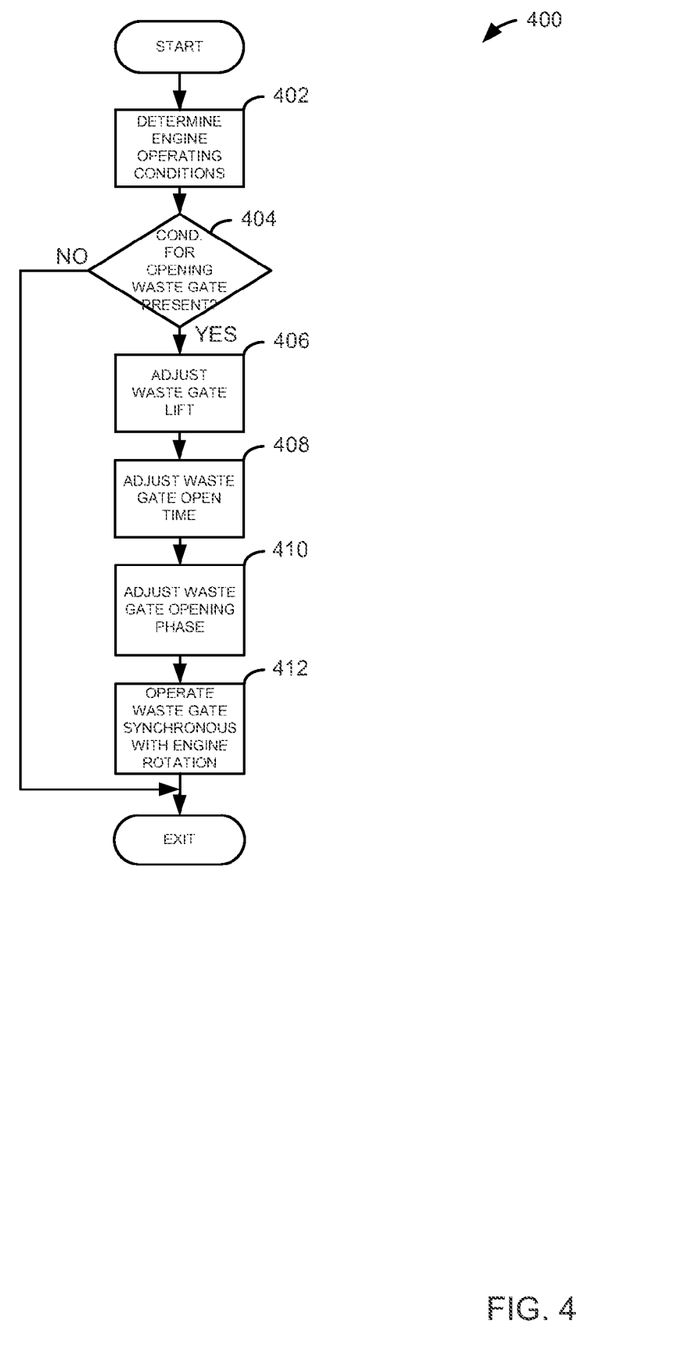
FIG. 4 is an example flowchart of a method for operating a turbocharger.

Referring now to FIG. 4, a method for operating a turbocharger waste gate is shown. The method of FIG. 4 may be stored as executable instructions in non-transitory memory of a controller. In one example, the instructions may be stored in controller 12 shown in FIG. 1. The instructions may provide the sequence illustrated in FIG. 3.

At 402, method 400 determines engine operating conditions. Engine operating conditions may include but are not limited to engine speed, engine load, engine position, boost pressure, atmospheric pressure, and engine temperature. Method 400 proceeds to 404 after engine operating conditions are determined.

At 404, method 400 judges whether or not conditions for opening the waste gate are present. In one example, the waste gate may be opened when pressure in the boost chamber is greater than a threshold pressure. In another example, the waste gate may be opened to limit engine torque. If method 400 judges conditions are present to open the waste gate, the answer is yes and method 400 proceeds to 406. Otherwise, the answer is no and method 400 proceeds to exit.

At 406, method 400 adjusts lift of the waste gate. The waste gate lift amount may be adjusted via the devices shown in FIGS. 2A-B or another suitable device. In one example, the lift of the waste gate from a valve seat may be adjusted via selecting between operating the waste gate via one or more cams. In other examples, the lift of the waste gate may be adjusted via a continuously variable mechanical lift adjustment. In still other examples, the waste gate lift may be adjusted by varying current supplied to an electromechanical actuator. In some examples, the waste gate lift amount may be equated with a waste gate opening amount. The waste gate lift or opening amount, at least in part, determines how much exhaust passes through the waste gate. Thus, the waste gate lift or opening amount controls the amount of energy supplied to the turbine and the compressor. Specific waste gate lift or opening amounts may be empirically determined and stored in tables or functions. For example, the waste gate lift may be adjusted as a function of intake manifold pressure and/or turbine speed. The tables or functions may be indexed via engine speed, load, intake manifold pressure, boost, or other variable. Method 400 proceeds to 408.

At 408, method 400 adjusts waste gate opening time. The waste gate opening time may be adjusted via the devices shown in FIGS. 2A-B or another suitable device. In one example, waste gate opening time may be adjusted to occur at for a predetermined crankshaft interval (e.g., 90 crankshaft degrees) as illustrated and described in FIG. 3. For example, the waste gate may be open when exhaust flow to the turbine during an engine cycle is higher than a threshold flow rate. The waste gate may be closed when exhaust flow to the turbine during the engine cycle is lower than the threshold flow rate. Further, in some examples where boost pressure is low, the waste gate may not be opened during a particular engine cycle. Specific waste gate opening durations may be empirically determined and stored in tables or functions. The tables or functions may be indexed via engine speed, load, intake manifold pressure, boost, or other variable. Thus, each time an engine cylinder blows down exhaust gas, the waste gate can be opened and closed. Method 400 proceeds to 410 after the waste gate opening time is adjusted. Of course, the waste gate closing time may be alternatively adjusted in a similar manner.

At 410, method 400 adjusts the waste gate opening phase. The waste gate start of opening timing phase (e.g., the crankshaft angle at which the waste gate first opens) may be adjusted via the devices shown in FIGS. 2A-B or another suitable device. In one example, the waste gate start of opening timing phase is adjusted with exhaust valve opening and/or closing timing. Further, the waste gate start of opening timing phase may be adjusted in response to engine speed, load, intake manifold pressure, boost, or other variable. For example, the waste gate opening time may be retarded at higher engine speeds to allow more exhaust gas to flow from the engine cylinder. The waste gate closing phase may also be adjusted in a similar manner. Method 400 proceeds to 412 after waste gate timing phase is adjusted.

At 412, method 400 operates the waste gate synchronous with engine rotation. The waste gate is operated according to the lift amount determined at 406, the opening timing determined at 408, and the opening and closing phase determined at 410. In one example, the waste gate is opened and closed multiple times as described in FIG. 3. In particular, the waste gate is opened and closed at several predetermined crankshaft angles. In one example, the waste gate is opened via a cam as shown in FIG. 2A or via an electromechanical actuator as shown in FIG. 2B. Method 400 proceeds to exit after the waste gate is operated.

Thus, the method of FIG. 4 provides for a method for operating a turbocharger, comprising: opening and closing a waste gate of a turbocharger synchronously with rotation of an engine. The method includes where the waste gate is closed during a blow down portion of a cylinder cycle. The method includes where the waste gate is closed one time for each cylinder of the engine during a cycle of the engine. In this way, spin up time (e.g., time for a turbine to change speed from a lower speed to a higher speed) turbine may be reduced while turbocharger efficiency is increased.

In one example, the method includes where the waste gate is comprised of a poppet valve. The method includes where the poppet valve is operated via rotation of the engine. In some examples, the method includes where the poppet valve is electromechanically operated. The method also includes where the poppet valve is operated via a cam. The method includes where the waste gate is operated synchronously with rotation of a crankshaft or a camshaft. The method includes where the waste gate is mechanically coupled to the crankshaft or camshaft.

The method of FIG. 4 also provides for a method for operating a turbocharger, comprising: opening and closing a waste gate of a turbocharger synchronously with rotation of an engine; and adjusting an opening amount of the waste gate in response to a pressure of an air intake of the engine. The method further comprises adjusting a closing time or an opening time of the waste gate relative to a crankshaft position in response to engine operating conditions. The method includes where the engine operating conditions are comprised of at least one of engine speed, engine load, and boost pressure.

In some examples, the method includes where the opening amount is a crankshaft angle duration when the waste gate is open. The method also includes where the opening amount is a lift amount of a valve from a valve seat. In still another example, the method includes where the waste gate is operated via rotation of the engine.

In another example, the method of FIG. 4 provides for operating a turbocharger, comprising: opening and closing a waste gate of a turbocharger during each engine cycle of a plurality of engine cycles, the plurality of engine cycles being consecutive. The method also includes where the waste gate is opened during a blow down portion of a cylinder cycle. The method includes where the waste gate begins closing during a blow down portion of the cylinder cycle. The method also includes where the waste gate is closed for at least 45 crankshaft degrees during an exhaust stroke of a cylinder while an exhaust valve of the cylinder is open. The method further comprises adjusting an opening time and a closing time of the waste gate in response to engine operating conditions.

As will be appreciated by one of ordinary skill in the art, routines described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:
1. A method for operating a turbocharger, comprising:
opening and closing a waste gate of the turbocharger after each compression stroke during a cycle of the engine;

adjusting an opening amount of the waste gate in response to engine intake air pressure via a controller that senses engine intake pressure;

and where the waste gate is mechanically coupled to a crankshaft.

2. The method of claim 1, where the waste gate is closed during a blow down portion of a cylinder cycle.

3. The method of claim 1, where the waste gate is closed one time for each cylinder of the engine during the cycle of the engine.

4. The method of claim 1, where the waste gate is comprised of a poppet valve.

5. The method of claim 4, where the poppet valve is operated via rotation of the engine.

6. The method of claim 5, where the poppet valve is operated via a cam.

7. The method of claim 1, where the waste gate is operated each time an exhaust valve opens.

8. A method for operating a turbocharger, comprising:
opening and closing a waste gate of the turbocharger after each compression stroke of an engine during a cycle of the engine via rotating the engine; and
adjusting an opening amount of the waste gate in response to engine intake air pressure via a controller that senses engine intake pressure.

9. The method of claim 8, further comprising adjusting a crankshaft angle at which the waste gate opens in response to engine operating conditions.

10. The method of claim 9, where the engine operating conditions include one or more of engine speed, engine load, and boost pressure.

11. The method of claim 8, where the opening amount is a lift amount of a valve from a valve seat.

12. The method of claim 11, further comprising adjusting the lift amount responsive to a turbine speed.

13. A method for operating a turbocharger, comprising:
opening and closing a waste gate of the turbocharger during each engine cycle of a plurality of consecutive engine cycles via a mechanical coupling between the waste gate and a crankshaft; and
adjusting an opening amount of the waste gate in response to engine intake air pressure via a controller that senses engine intake pressure.

14. The method of claim 13, where the waste gate is opened during a blow down portion of a cylinder cycle.

15. The method of claim 14, where the waste gate begins closing during the blow down portion of the cylinder cycle.

16. The method of claim 15, where the waste gate is closed for at least 45 crankshaft degrees during an exhaust stroke of a cylinder while an exhaust valve of the cylinder is open.

17. The method of claim 13, further comprising adjusting an opening time and a closing time of the waste gate in response to engine operating conditions.

* * * * *